United States Patent [19]

Brown

[11] Patent Number: 4,718,599

[45] Date of Patent: Jan. 12, 1988

[54] CONTROL SYSTEMS

[75] Inventor: Alan R. W. Brown, Northolt, United Kingdom

[73] Assignee: Zealtown Limited, Edgware, United Kingdom

[21] Appl. No.: 926,464

[22] Filed: Nov. 3, 1986

[51] Int. Cl.⁴ ................................................ F23N 5/20
[52] U.S. Cl. .................................... 236/46 R; 165/22; 236/51
[58] Field of Search ............. 236/46 R, 51; 165/12 R, 165/22; 364/551, 505; 237/8 R

[56] References Cited

U.S. PATENT DOCUMENTS

| | | | |
|---|---|---|---|
| 3,979,060 | 9/1976 | Tierce | 236/46 R |
| 4,298,163 | 11/1981 | Richardson et al. | 236/51 X |
| 4,299,096 | 11/1981 | Nan Camp | 236/46 R |
| 4,313,560 | 2/1982 | Stiles | 236/46 R |

*Primary Examiner*—William E. Wayner
*Attorney, Agent, or Firm*—Christie, Parker & Hale

[57] ABSTRACT

A central heating control system includes a control panel housing a timer. The timer has three programme sequences for controlling three groups of radiators each group being independently controlled. The control panel also includes switch units which are selectively operable to isolate each radiator. The switch units are triggered by infrared signals transmitted by a portable control unit. The signals may be received directly by the panel or indirectly through spaced windows coupled to the control panel by an optical fibre network. The system provides an exceptionally convenient method of modifying a programmed heating system.

10 Claims, 3 Drawing Figures

CONTROL SYSTEMS

BACKGROUND OF THE INVENTION

1. Field of the Invention

The present invention relates to control systems for controlling a plurality of different areas to be heated or cooled.

2. Description of the Prior Art

Domestic central heating systems are known in which a gas fired boiler supplies water to a hot water tank and also supplies hot water for a heating circuit comprising a plurality of hot water radiators and powered by an electric pump.

Such systems are often controlled by a timer which acts both to set the ON period for the hot water tank and the ON period for the heating circuit.

Where the heating circuit includes a plurality of different radiators heating different rooms, all the rooms must be heated simultaneously. As different heating requirements arise the timing of the timer must be adjusted.

The disadvantage of this system is its relative inflexibility and the difficulty with which the instantaneous heating requirements of an occupant can be met.

It is an object of the invention to provide a control system which can be readily adjusted to meet the heating requirements of an occupant.

SUMMARY OF THE INVENTION

According to the present invention there is provided a control system for remotely controlling a plurality of terminal units divided into a plurality of different groups, the system comprising a timer having a plurality of programme sequences equal in number to the number of groups of terminal units, means for connecting each group of terminal units to the timer so as to be controlled in response to a corresponding one of said programme sequences, and switch means for each terminal unit located remote from each terminal unit for selectively disconnecting and reconnecting each terminal unit to the connecting means.

According to the present invention there is further provided a control system for remotely controlling a plurality of terminal units divided into a plurality of different groups, the system comprising a timer having a plurality of outputs, each output being energised and de-energised in response to one of a plurality of independent programme sequences equal in number to the number of groups, a plurality of switch banks equal in number to the number of groups, each bank being connected to a corresponding output of the timer to feed a corresponding one of said groups of terminal units, each bank containing a switch for coupling each terminal unit of the corresponding group to the corresponding output of the timer feeding the bank, and control means including a portable transmitter for transmitting a unique signal for each terminal unit and a receiver for receiving said unique signal and triggering the switch associated with that terminal unit to disconnect that terminal unit from the timer whereby said control means can selectively isolate by remote control each terminate unit from the timer.

BRIEF DESCRIPTION OF THE DRAWINGS

A control system embodying the invention will now be described, by way of example, with reference to the accompanying diagrammatic drawings in which.

DESCRIPTION OF THE PREFERRED EMBODIMENT

Figure 1:
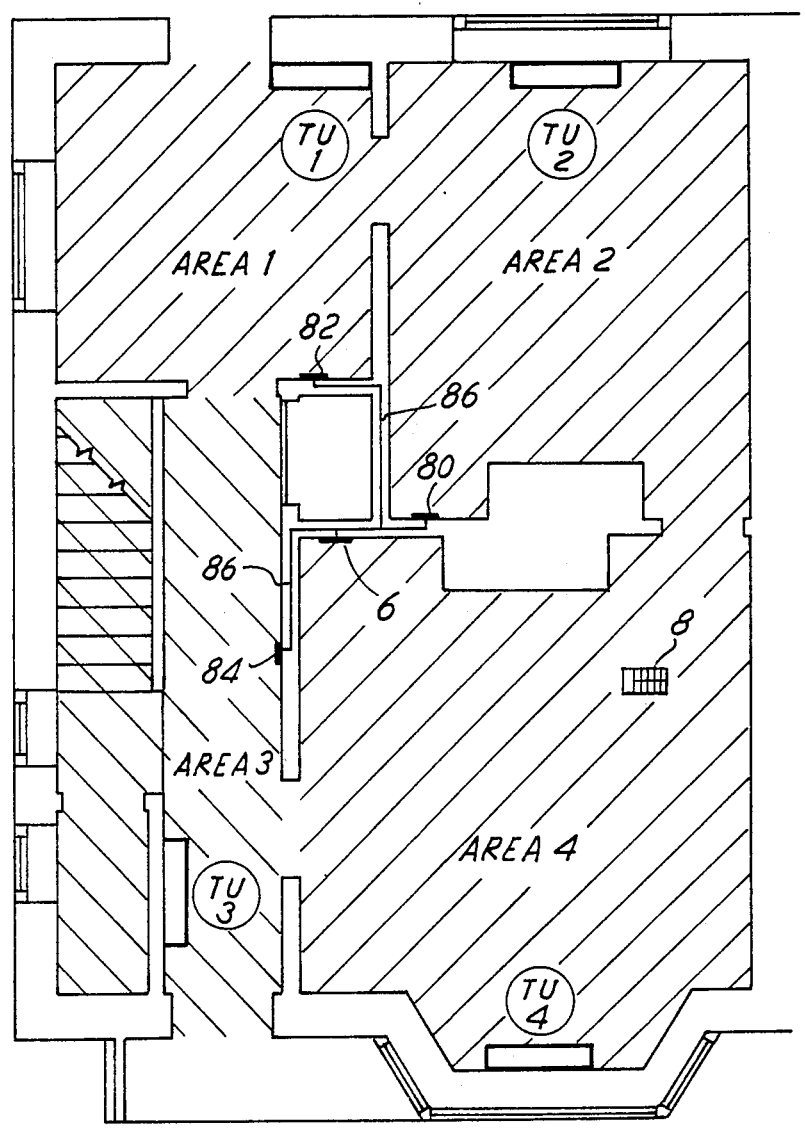
FIG. 1 is a plan view of the ground floor of a domestic residence.

As shown in FIG. 1 a residence is divided into four discrete areas AREAS 1 to 4. Each area is provided with a respective terminal unit TU1 to TU4 for changing the temperature in each area.

Where the residence is to be heated each terminal unit can take the form of a hot water radiator controlled by an electrically operated valve, a low pressure hot water fan assisted coil unit, a wall mounted heat pump, a natural convector controlled by an electrically controlled valve or any other heat emitting unit which can be remotely controlled.

Where the residence is to be cooled each terminal unit can take the form of a chilled water fan coil unit, a refrigerant fan assisted coil unit, a chilled water heat pump, a refrigerant heat pump or any other heat extracting unit which can be remotely controlled.

A wall mounted control panel 6 is provided in one of the areas and a portable control unit 8 is provided for use by the occupant of the residence.

Figure 2:
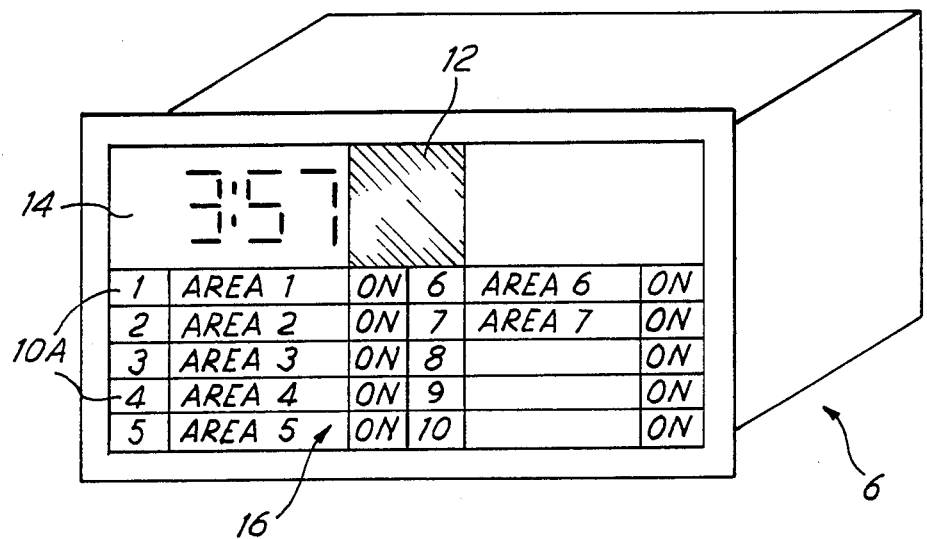
FIG. 2 is a perspective view of a control panel and hand control unit of the system.
Figure 2:
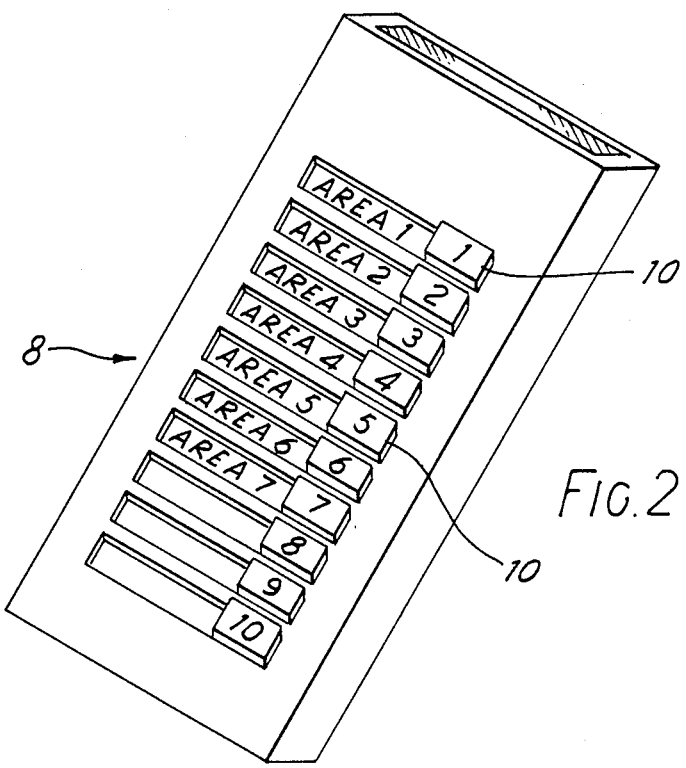

As shown more clearly in FIG. 2 the control unit 8 incorporates an infrared transmitter for transmitting infrared signals to an infrared receiver located in the control panel 6.

The control unit 8 also includes a plurality of keys 10 each of which corresponds to a respective one of the areas. When a key is depressed a unique signal corresponding to a selected area is transmitted.

The control panel 6 is provided with a window 12 through which infrared signals can be received, a digital clock 14 for displaying the time, and a display 16 for displaying the status of each terminal unit.

A plurality of keys 10A are also provided to enable the control panel to be manually operated instead of by the control unit 8.

Figure 3:
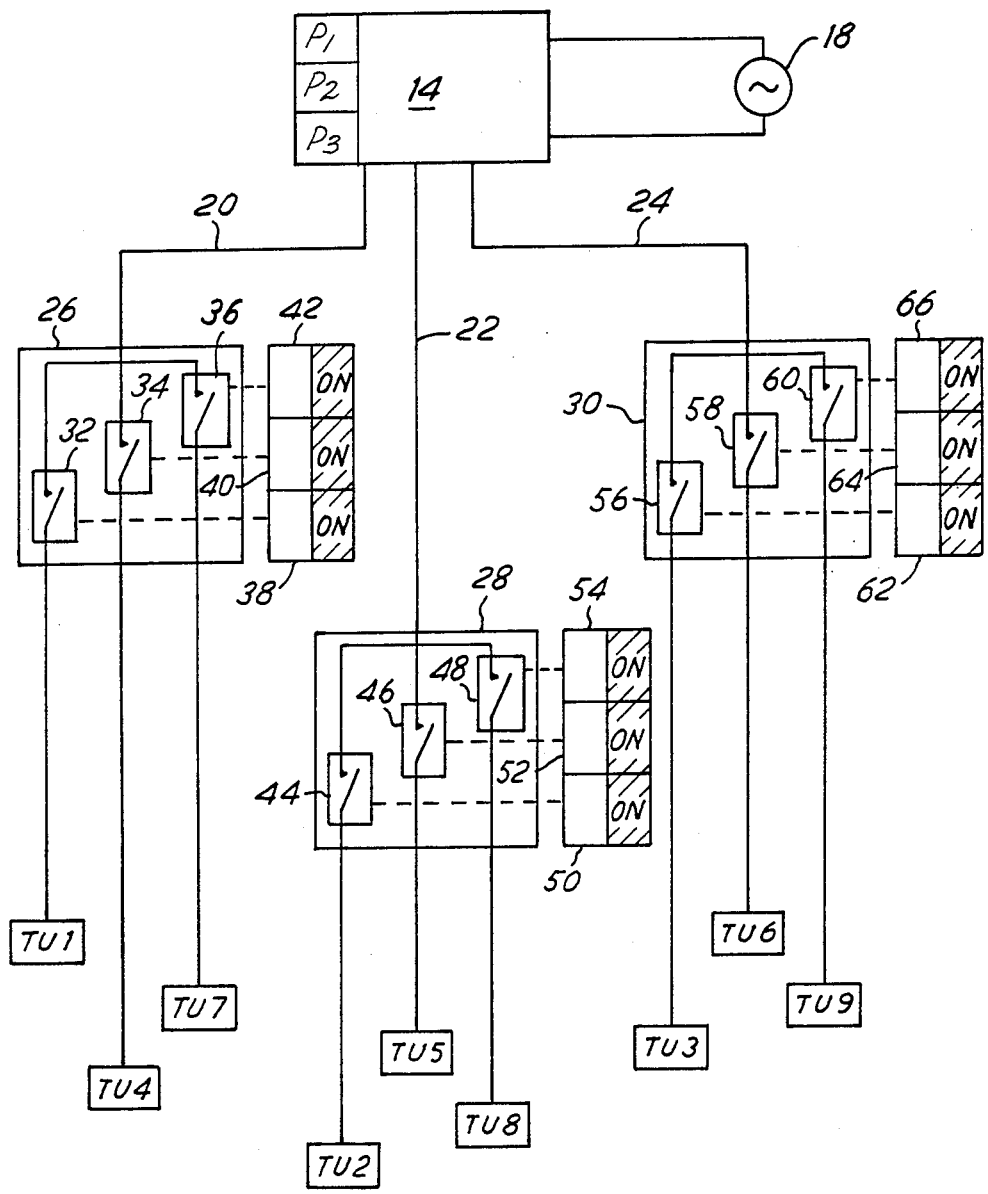
FIG. 3 is a block diagram of the control panel of FIG. 2.

A block diagram of the control panel 6 is shown in FIG. 3.

The timer 14 is connected to an AC source 18. The timer 14 has at least three separate programmes P1, P2 and P3 by means of which it can energise three separate lines 20, 22 and 24 for different periods at different times of the day. The timer 14 is programmable so that the times and periods can be set to any desired values. Each line 20 to 24 is connected to a respective one of three banks 26, 28 and 30 of switches. Each bank of switches controls a respective group of terminal units. Thus the switch bank 26 controls terminal units TU1, TU4 and TU7, the switch bank 28 controls terminal units TU2, TU5 and TU8, and the switch bank 30 controls terminal units TU3, TU6 and TU9.

The switch bank 26 contains three contact sets 32, 34 and 36 which are controlled by switching units 38, 40 and 42.

The switch bank 28 contains three contact sets 44, 46 and 48 which are controlled by switching units 50, 52 and 54. The switch bank 30 contains three contact sets 56, 58, 60 which are controlled by switching units 62, 64 and 66.

Each contact set is opened and closed by successive triggerings of the corresponding switching unit.

Each switching unit has an associated lamp unit which illuminates an "ON" sign when the corresponding contact set is both closed and energised.

Each switching unit may take the form of a relay coil which is energised when one f the keys 10 or 10A is depressed. Instead each contact set may take the form of a semiconductor switch and the associated switching unit may be in the form of a control circuit therefor.

In operation the timer 14 is programmed selectively to switch the different groups of terminal units ON at different times during each day. The terminal units are preferably grouped together according to their function. Thus, for example the terminal units in the common parts of the residence, for example the halls and the lobbies may be put in a first group; the terminal units in the living areas of the residence, for example the kitchen and the lounge may be put in a second group, and the terminal units in the sleeping quarters put in a third group. The programming may be such as to maintain the terminal units in the first group ON for 24 hours of the day, the terminal units in the second group ON for the afternoon and evening and the terminal units in the third group ON for the evening and early morning.

Over the period of 24 hours the timer will switch the associated terminal units ON and OFF in accordance with the set programme.

If the occupant of the residence at any time decides that he wishes to switch a terminal unit OFF such as when for example one bedroom is not being occupied he merely operates the appropriate key 10 on the control unit 8. The control unit 8 generates a coded infrared signal which it transmits to the receiver of the control panel. The receiver responds by triggering the appropriate switching unit which in turn opens the corresponding contact set and the selected terminal unit is disconnected from the timer 14.

In this manner the terminal units throughout the residence can be readily brought in or left out of the programmed system according to the occupants' requirements. The switching can be readily carried out from a comfortable position by the occupant much in the manner of using the remote control unit to change channels on a television set.

As shown in FIG. 1 each room in the residence is provided with an infrared signal receiving window 80, 82 and 84 which is coupled to the window 12 of the control panel 6 by a network of fibre optics 86.

In this way the control unit 8 can be taken from room to room and the switching units thus controlled from any room in the residence.

The same network of fibre optics may be used to display on or around the windows 80, 82 and 84 the ON status of each area as presented on the display of the control panel.

Where the terminal units are hot water radiators each with a remotely operable valve and each coupled to a common central heating gas boiler it will be appreciated that the boiler can be left running continuously. The ability of the occupant selectively, instantaneously and effortlessly to isolate any radiator from the system can result in very significant fuel savings.

In previous systems, while it has always been possible to isolate individual radiators from the system by actually physically going to the area in question and turning the terminal unit OFF it has in practice never been very successful because of the bother, effort and time needed to effect such a switch off coupled with the through that perhaps the same unit may need to be brought into the system again within a couple of hours.

The present system allows for an almost effortless control from any location in the residence.

The described system is equally suitable for controlling an array of air conditioning units located around the residence. Here again rooms throughout the residence can be cooled at will. Selected rooms can be cooled in advance of the occupant entering the room.

While the lines feeding the terminal units are low power control signal lines for effecting a switching at the terminal unit, it will be appreciated that where the terminal units are drawing significant amounts of power from the mains this power may be supplied through the timer provided the wiring is upgraded for heavy duty operation.

Instead of the control unit 8 sending infrared signals to the control panel it can communicate through other media for example ultrasonic or even radio signals.

While a presently preferred embodiment of the present invention has been illustrated and described, modifications and variations thereof will be apparent to those skilled in the art given the teachings herein, and it is intended that all such modifications and variations be encompassed within the scope of the appended claims.

I claim:

1. A control system
   for remotely controlling a plurality of terminal units divided into a plurality of different groups, the system comprising
   a timer having a plurality of programme sequences equal in number to the number of groups of terminal units,
   means for connecting each group of terminal units to the timer so as to be controlled in response to a corresponding one of said programme sequences,
   switch means for each terminal unit located remote from each terminal unit for selectively disconnecting and reconnecting each terminal unit to the connecting means, and
   remote control means for selectively triggering each switch means.

2. A system according to claim 1 wherein said remote control means comprises a portable infrared transmitter and an infrared receiver coupled to said switch means.

3. A system according to claim 2 including a control panel incorporating said timer, the switch means and the receiver.

4. A control system for remotely controlling a plurality of terminal units divided into a plurality of different groups, the system comprising
   a timer having a plurality of outputs, each output being energised and de-energised in response to one of a plurality of independent programme sequences equal in number to the number of groups,
   a plurality of switch banks equal in number to the number of groups,
   means connecting each bank to a corresponding output of the timer to feed a corresponding one of said groups of terminal units,
   a switch contained in each bank for coupling each terminal unit of the corresponding group to the corresponding output of the timer feeding the bank, and control means including
- a portable transmitter for transmitting a unique signal for each terminal unit, and
- a receiver for receiving said unique signal and triggering the switch associated with that terminal unit to disconnect that terminal unit from the timer whereby said control means can selectively isolate by remote control each terminal unit from the timer.

5. A system according to claim 4 wherein said transmitter and receiver are arranged to transmit and receive infrared signals.

6. A system according to claim 5 wherein the receiver is provided with a plurality of signal receiving windows at spaced locations and all coupled to the receiver by a fibre optic network.

7. A system according to claim 4 wherein each terminal unit comprises a hot water radiator supplied from a common boiler and has a remotely operable valve electrically connected to a corresponding one of said banks.

8. A system according to claim 4 wherein each terminal unit comprises an air conditioning unit which is energised through a corresponding one of said banks.

9. A system according to claim 4 wherein each terminal unit comprises a hot water radiator supplied from a common boiler and has a remotely operable valve electrically connected to a corresponding one of said banks.

10. A system according to claim 4 wherein each terminal unit comprises an air conditioning unit which is energised through a corresponding one of said banks.

* * * * *